Nov. 12, 1957

I. NASSOFER 2,812,838

FRICTION GEAR DRIVE MECHANISM

Filed Dec. 7, 1954

INVENTOR:
IRVING NASSOFER,
DECEASED
By MARCIA NASSOFER,
ADMINISTRATRIX

BY

ATTORNEY

Nov. 12, 1957     I. NASSOFER     2,812,838
FRICTION GEAR DRIVE MECHANISM
Filed Dec. 7, 1954     2 Sheets-Sheet 2
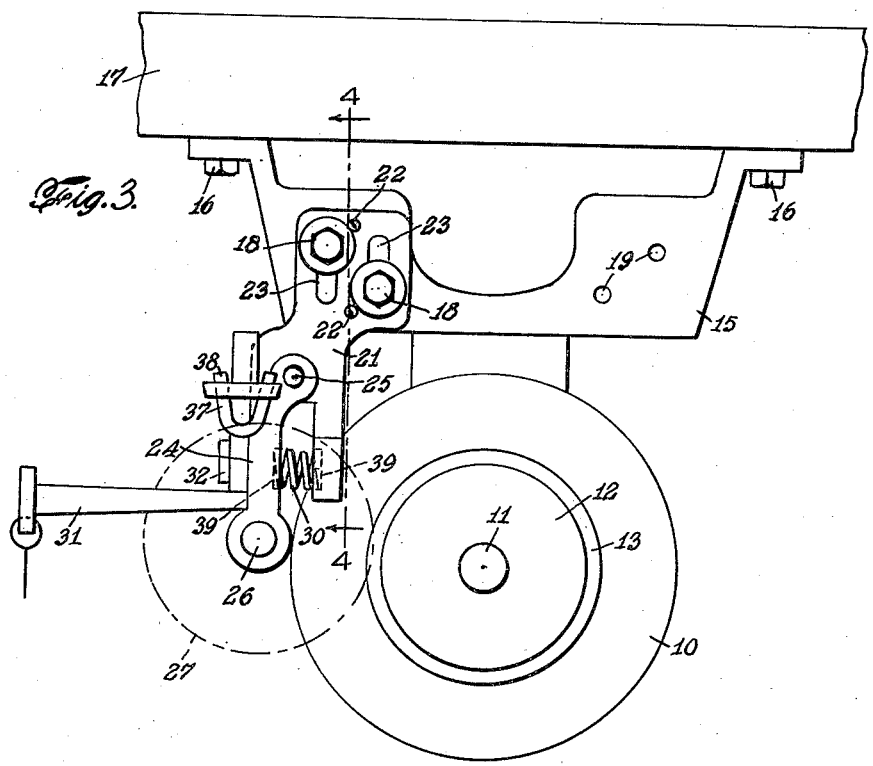
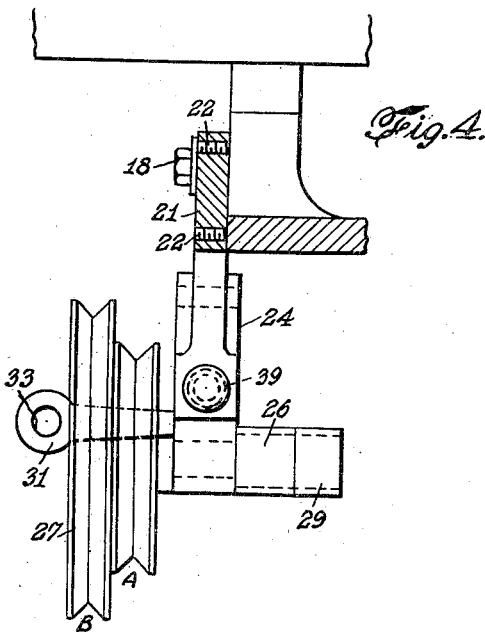
INVENTOR:
IRVING NASSOFER,
DECEASED
by MARCIA NASSOFER,
ADMINISTRATRIX
ATTORNEY

United States Patent Office 2,812,838
Patented Nov. 12, 1957

2,812,838

FRICTION GEAR DRIVE MECHANISM

Irving Nassofer, deceased, late of Brooklyn, N. Y., by Marcia Nassofer, administratrix, Brooklyn, N. Y.

Application December 7, 1954, Serial No. 473,532

4 Claims. (Cl. 192—4)

This invention relates to a friction gear drive mechanism and has for its object to provide a friction gear to drive a head assembly; as will be apparent hereafter greater efficiency of a motor is obtained in the driving of the head assembly; power is transmitted to a drive wheel of the head assembly at a controllable and uniform speed by the use of the centrifugal force of the friction gear attached to the armature shaft of the motor.

A further object of this invention is to minimize slippage in the application of the drive wheel of the head assembly to the friction gear while not necessitating precision alignment.

These and other advantages are made possible by the novel construction of the applicant's invention in which, among other features, a friction pulley having a continuous friction belt set in a circumferential groove of said friction pulley known as a friction gear, is used. This friction gear is in alignment with a grooved drive wheel which makes contact with said friction gear upon application of pressure to an operating arm lever attached to the head assembly. The drive wheel is provided with two circumferential grooves; one to make contact with said friction gear and the other for a driving belt for transmitting power to, for instance, a sewing machine or the like.

Due to this indirect application of movement of the drive wheel to the friction gear there is no thrust pressure of the motor armature against the back housing of the motor, thus obtaining greater efficiency of the motor, as well as a controllable and uniform speed transmitted to the drive wheel.

Inasmuch as the power to the drive wheel which is part of the head assembly is obtained by the contact of the friction belt of the friction gear to the drive wheel, slippage is at a minimum without necessitating precision alignment.

A journal arm having a drive wheel shaft and the aforementioned drive wheel attached thereto, is held in an off position by a spring set between the journal arm and a bracket until pressure is applied to the operating arm lever; upon pressure being released, the drive wheel is separated from the friction gear and comes into contact with a brake mechanism which has a brake facing, thus causing the drive wheel to come to an immediate stop.

The brake mechanism which is attached to the bracket, said bracket having journal arm attached thereto by means of a fulcrum pin, said journal arm having the drive wheel shaft and the aforementioned drive wheel attached thereto so that upon the release of pressure to the operating arm lever said drive wheel is not in operation nor in contact with the friction gear but comes in contact with the brake mechanism causing the drive wheel to come to an immediate stop.

The aforementioned bracket which has the journal arm attached thereto by means of the fulcrum pin is attached to a base. Said base is adapted to have the motor mounted thereon.

Thus, as above indicated it is shown that the main component parts of the friction gear drive mechanism consists of the base, the friction gear and the clutch head assembly; said head assembly consists of the drive wheel, drive wheel shaft, journal arm, fulcrum pin, spring, bracket, operating arm lever and the brake mechanism.

The brake mechanism, or braking block, is so constructed as to be adjustable and easily removed for replacing the brake facing. Said brake mechanism is reversible when head assembly is used in a reserve position.

By the adaptation of various size driving wheels and/or friction gears various speeds may be transmitted to the driving belt.

The drive wheel and friction gear may be easily removed without disturbing the alignment of the head assembly.

With the above and other objects in view, this invention consists of the novel features of construction, combination and arrangement of parts, hereinafter fully described, claimed and illustrated in the accompanying drawings, forming part of this specification, and in which similar characters of reference indicate corresponding parts in all views, and in which:

Figure 3 is an end view of the said device; while

Figure 4 is a detail view of the head assembly.

Figure 1:
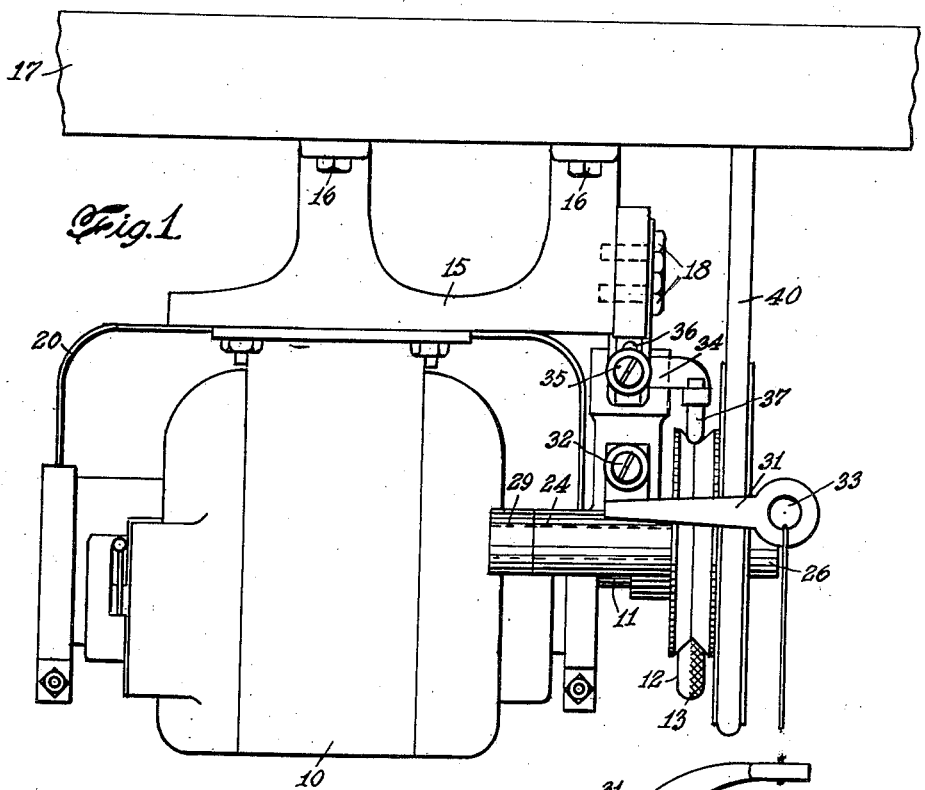
Figure 1 represents a front view of the improved friction drive mechanism.
Figure 2:
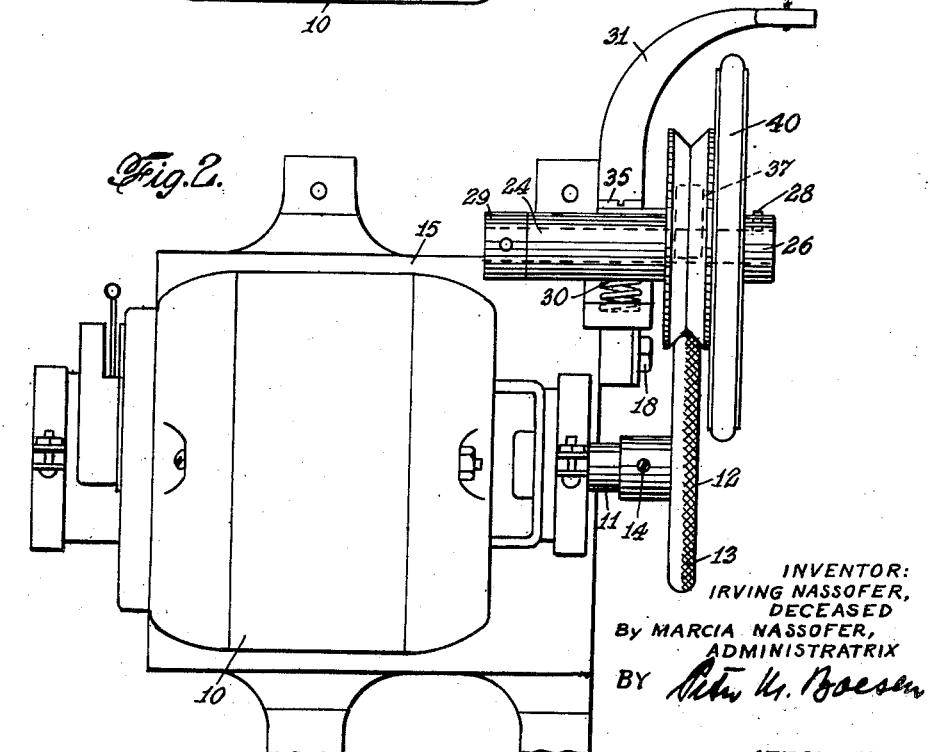
Figure 2 is a bottom view of the same.

Referring more particularly to the drawings, the numeral 10 indicates an electric motor, 11 the armature shaft of the motor, the numeral 12 indicates the friction pulley secured to the armature shaft by a set screw 14 while 13 denotes a friction belt attached to said friction pulley 12. The combination of 12 and 13 constitutes a friction gear.

A base 15 has the motor 10 mounted thereon and is held by bolts 16 to a table 17.

The base is indicated by 15; said clutch base is adapted to have the motor base 20 mounted thereon by means of slots (not shown) in order to secure the motor base in adjustable positions, the base is secured to the table 17 by screws 16, and the head assembly, as shown in Figures 1 and 3 attached to the base by screws 18; while the numeral 19 indicates threaded holes for use when the clutch head assembly is placed in reverse position; the numeral 21 indicates a bracket attached to the base 15 by screws 18; while in reverse position, as aforesaid, the threaded holes 19 come into use. The adjustment screws 22 serve the purpose of lining up the head assembly in the same plane as the friction gear attached to the armature shaft 11.

The head assembly is adjusted to the same plane as the armature shaft 11 by two elongated slots 23. A journal arm 24 is attached to the bracket 21 by means of a fulcrum pin 25, said journal arm is adapted to receive the shaft 26. The numeral 27 indicates a drive pulley provided with two grooves A and B; said drive pulley is attached to shaft 26 by a set screw 28. The groove A of the drive pulley 27 is adapted to receive the friction belt 13; while groove B receives the belt 40, for transmitting power to, for instance, a sewing machine, or the like; and drive pulley 27 mounted on shaft 26 is held in place by a collar 29.

A spring 30 is held in place between bracket 21 and the journal arm 24 by counter-bored holes 39; the purpose of said spring is to keep the journal arm 24, which has drive pulley 27, separated from the friction pulley 12, which latter has the friction belt 13 attached thereto.

An operating lever 31 is secured to the journal arm 24 by screw 32, so that when pressure is applied to said operating lever it counteracts the action of the spring 30, thereby permitting groove A of the drive pulley 27 to come into contact with the friction belt 13 of the friction pulley 12. In the operating lever 31 is shown a hole 33 for the attachment of a rod or wire connected to a treadle (not shown) to activate clutch head assembly.

The numeral 34 indicates the brake mechanism secured to the bracket 21 by means of screw 35 having an elongated slot 36 for adjustment purposes. The numeral 37 indicates braking material affixed to the brake block 34 so that when pressure is released from the operating lever 31 the journal arm 24 rises to make contact with the friction belt 13 of the friction pulley 12, thereby taking the groove A of wheel 27 off the brake mechanism 34.

The brake mechanism 34 is reversible when the assembly is used in reverse position.

What is claimed as new, and desired to be secured by Letters Patent, is:

1. In a device of the class described, a friction gear drive mechanism comprising an electric motor, a friction pulley secured to the armature shaft of said motor, and a friction belt of the friction gear attached to said friction pulley, a base having the motor mounted thereon, and a head assembly supported by said base, the latter being adapted to receive the head assembly in reverse position, a journal arm forming part of said head assembly and being adapted to receive a shaft, a drive wheel having two grooves and being attached to said shaft, the friction belt of the friction pulley making contact to the drive wheel in one of said grooves, and a driving belt in the other groove, a spring adapted to hold said journal arm in an off position, when not in motion.

2. A device as claimed in claim 1, and having a braking mechanism normally held in closed position, the drive wheel being released by pressure being applied to an operating arm lever, thereby bringing said wheel in contact with the friction gear, disengaging at the same time said wheel from the block of said braking mechanism.

3. In a device of the class described, in combination, a table, a base fixedly secured to the latter, and an electric motor mounted on said base, an armature shaft secured to said motor, a friction drive pulley mounted on said shaft; a bracket being attached secured to the base, a head assembly being adjustable to the same plane as the armature shaft, a journal arm being attached to the bracket of the head assembly, a fulcrum pin securing said journal arm to the latter, a shaft connected to the journal arm, and a drive pulley, formed with two grooves, mounted on said latter shaft, a friction ring of the friction drive pulley being received by one of said grooves, and a power transmitting belt in the other groove.

4. In a device, as claimed in claim 3, and having a spring arranged between the bracket of the clutch head assembly and the journal arm to keep said journal arm with the drive pulley separated from the friction pulley; and an operating lever secured to said journal arm.

References Cited in the file of this patent

UNITED STATES PATENTS

| | | |
|---|---|---|
| 910,901 | Bucherer | Jan. 26, 1909 |
| 1,133,687 | Wesley | Mar. 30, 1915 |
| 1,180,109 | Curry | Apr. 18, 1916 |

FOREIGN PATENTS

| | | |
|---|---|---|
| 426,409 | Great Britain | Apr. 3, 1935 |